(12) United States Patent
Chiang

(10) Patent No.: US 12,028,663 B2
(45) Date of Patent: Jul. 2, 2024

(54) DATA CENTER INTERCONNECT

(71) Applicant: Infinera Corp., San Jose, CA (US)

(72) Inventor: Ting-Kuang Chiang, Sunnyvale, CA (US)

(73) Assignee: Infinera Corporation, San Jose, CA (US)

( * ) Notice: Subject to any disclaimer, the term of this patent is extended or adjusted under 35 U.S.C. 154(b) by 0 days.

(21) Appl. No.: 17/814,213

(22) Filed: Jul. 21, 2022

(65) Prior Publication Data
US 2023/0024349 A1 Jan. 26, 2023

Related U.S. Application Data

(60) Provisional application No. 63/224,192, filed on Jul. 21, 2021.

(51) Int. Cl.
*H04B 10/00* (2013.01)
*H04Q 11/00* (2006.01)
*H04J 14/00* (2006.01)

(52) U.S. Cl.
CPC ..... *H04Q 11/0067* (2013.01); *H04Q 11/0005* (2013.01); *H04Q 11/0062* (2013.01); *H04Q 2011/0052* (2013.01); *H04Q 2011/0075* (2013.01)

(58) Field of Classification Search
CPC ......... H04B 10/272; H04L 49/70; G06N 3/04
See application file for complete search history.

(56) References Cited

U.S. PATENT DOCUMENTS

| | | | |
|---|---|---|---|
| 9,800,630 B2 * | 10/2017 | Gustlin | H04L 47/13 |
| 2022/0141138 A1 * | 5/2022 | Ravi | H04L 47/2483 370/235 |
| 2023/0308393 A1 * | 9/2023 | Zahid | H04L 47/125 709/226 |

* cited by examiner

*Primary Examiner* — Daniel G Dobson
(74) *Attorney, Agent, or Firm* — David L. Soltz

(57) ABSTRACT

Comprises aggregating data received by a first number of server ports of an edge switch. The server ports operate at a first data speed. The aggregated data is distributed into a plurality of virtual lanes with each virtual lane carrying a portion of the aggregated data at a second data speed less than the first data speed.

21 Claims, 9 Drawing Sheets

DATA CENTER INTERCONNECT

CROSS REFERENCE TO RELATED APPLICATION

This application claims the benefit of U.S. Provisional Patent Application No. 63/224,192, filed on Jul. 21, 2021, the entire content of which is hereby incorporated herein by reference in its entirety.

BACKGROUND

Large data centers generally comprise many hundreds or thousands of servers networked together. In order to provide fast network connectivity between servers, this has resulted in various data center architectures, such as the standard fat-tree data center architecture. A fat-tree data center generally utilizes n-port switches at all three stages (edge stage, aggregation stage, and core stage). Groups of switches in the edge stage and the aggregation stage may be formed into pods.

Since each port in each core switch is connected to each pod, the N-port core switch can connect to N number of pods. Each pod, in turn, has N/2 edge switches and N/2 aggregation switches. Each edge switch is connected to all N/2 aggregation switches within the same pod and each aggregation switch is connected to all N/2 edge switches within the same pod. Additionally, each aggregation switch is connected to N/2 core switches such that different aggregation switches in the same pod are connected to different core switches. Since there are N/2 aggregation switches in each pod, there are $(N/2)^2$ core switches in the fat-tree data center. Moreover, each edge switch is connected to N/2 servers. Therefore, there can be (N/2)*(N/2) servers supported in each pod. Since each of the N/2 edge switches is connected to all N/2 aggregation switches, there are (N/2)*(N/2) interconnect links between edge switches and aggregation switches in each pod. For example, if each core switch is a 128-port core switch, and each interconnect link is a 100 Gbps (Gigabit per second) link, then there are 4,096 100 Gbps links in each pod between edge switches and aggregation switches, and, thus, there are 524,288 100 Gbps links in the fat-tree data center between edge switches and aggregation switches.

In traditional very high-speed optical communications in a datacenter interconnect described above, e.g., greater than 25 Gbps, the optical transceivers use large amounts of power and generate significant heat to provide the required speeds. For the example above, if each traditional transceiver consumes about 2 W of power, then the transceivers for the traditional pods consume approximately 16.4 kW. As the number of pods increase, the power consumed increases such that, with 128 pods, approximately 2.1 MW is consumed.

To increase data transfer capacity, components, such as the optical transceivers, require increased power to provide an increase in data transfer capacity. Traditional solutions, however, exacerbate power supply requirements. Alternative optical transceivers that operate at a lower, power, however, have a much lower data bandwidth and lower data transfer speed than their higher-power counterparts.

Therefore, a need exists for a system utilizing lower-power optical transceivers while maintaining high-speed optical communications.

SUMMARY

The problem of utilizing lower-power optical transceivers while maintaining high-speed optical communications is solved by a comprises aggregating data received by a first number of server ports of an edge switch. The server ports operate at a first data speed. The aggregated data is distributed into a plurality of virtual lanes with each virtual lane carrying a portion of the aggregated data at a second data speed less than the first data speed. The data center interconnect includes a combination of edge switches, shuffle switches and aggregation switches. Each edge switch has a plurality of server ports and a plurality of shuffle ports. Each server port receives data signals from a server at a first data speed. A first number (n) of server ports exceeds a second number of shuffle ports (m), and the edge switches having first circuitry to aggregate data from multiple server ports and pass the aggregated data to a particular one of the shuffle ports. Each shuffle port has a plurality of first optical transmitters with each first optical transmitter having a second data speed less than the first data speed. The first optical transmitters for each shuffle port has an aggregated data rate exceeding the first data speed. The first optical transmitter generates first optical data streams carrying a portion of the aggregated data. Implementations of the above techniques include methods, apparatus, systems, and computer program products. One such computer program product is suitably embodied in a non-transitory computer-readable medium that stores instructions executable by one or more processors. The instructions are configured to cause the one or more processors to perform the above-described actions.

The details of one or more implementations of the subject matter of this specification are set forth in the accompanying drawings and the description below. Other aspects, features and advantages will become apparent from the description, the drawings, and the claims.

BRIEF DESCRIPTION OF DRAWINGS

The accompanying drawings, which are incorporated in and constitute a part of this specification, illustrate one or more implementations described herein and, together with the description, explain these implementations. The drawings are not intended to be drawn to scale, and certain features and certain views of the figures may be shown exaggerated, to scale or in schematic in the interest of clarity and conciseness. Not every component may be labeled in every drawing. Like reference numerals in the figures may represent and refer to the same or similar element or function. In the drawings.

DETAILED DESCRIPTION

Figure 1:
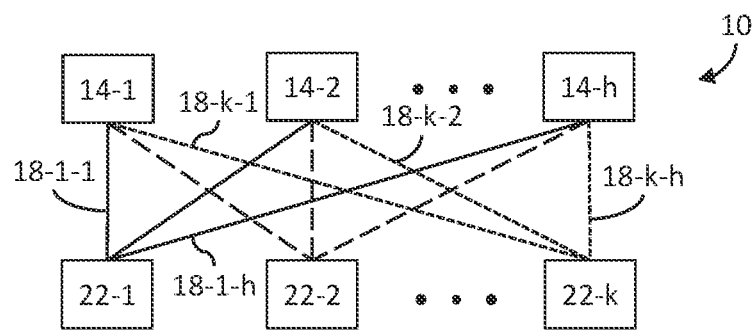
FIG. 1 is a diagrammatic view of an exemplary embodiment of a distributed data center constructed in accordance with the present disclosure.

The following detailed description of example embodiments refers to the accompanying drawings. The same reference numbers in different drawings may identify the same or similar elements.

Before explaining at least one embodiment of the disclosure in detail, it is to be understood that the disclosure is not limited in its application to the details of construction, experiments, exemplary data, and/or the arrangement of the components set forth in the following description or illustrated in the drawings unless otherwise noted.

The disclosure is capable of other embodiments or of being practiced or carried out in various ways. Also, it is to be understood that the phraseology and terminology employed herein is for purposes of description and should not be regarded as limiting.

As used in the description herein, the terms "comprises," "comprising," "includes," "including," "has," "having," or any other variations thereof, are intended to cover a non-exclusive inclusion. For example, unless otherwise noted, a process, method, article, or apparatus that comprises a list of elements is not necessarily limited to only those elements but may also include other elements not expressly listed or inherent to such process, method, article, or apparatus.

Further, unless expressly stated to the contrary, "or" refers to an inclusive and not to an exclusive "or". For example, a condition A or B is satisfied by one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more, and the singular also includes the plural unless it is obvious that it is meant otherwise. Further, use of the term "plurality" is meant to convey "more than one" unless expressly stated to the contrary.

As used herein, qualifiers like "substantially," "about," "approximately," and combinations and variations thereof, are intended to include not only the exact amount or value that they qualify, but also some slight deviations therefrom, which may be due to computing tolerances, computing error, manufacturing tolerances, measurement error, wear and tear, stresses exerted on various parts, and combinations thereof, for example.

As used herein, any reference to "one embodiment," "an embodiment," "some embodiments," "one example," "for example," or "an example" means that a particular element, feature, structure, or characteristic described in connection with the embodiment is included in at least one embodiment and may be used in conjunction with other embodiments. The appearance of the phrase "in some embodiments" or "one example" in various places in the specification is not necessarily all referring to the same embodiment, for example.

The use of ordinal number terminology (i.e., "first", "second", "third", "fourth", etc.) is solely for the purpose of differentiating between two or more items and, unless explicitly stated otherwise, is not meant to imply any sequence or order of importance to one item over another.

The use of the term "at least one" or "one or more" will be understood to include one as well as any quantity more than one. In addition, the use of the phrase "at least one of X, Y, and Z" will be understood to include X alone, Y alone, and Z alone, as well as any combination of X, Y, and Z.

Where a range of numerical values is recited or established herein, the range includes the endpoints thereof and all the individual integers and fractions within the range, and also includes each of the narrower ranges therein formed by all the various possible combinations of those endpoints and internal integers and fractions to form subgroups of the larger group of values within the stated range to the same extent as if each of those narrower ranges was explicitly recited. Where a range of numerical values is stated herein as being greater than a stated value, the range is nevertheless finite and is bounded on its upper end by a value that is operable within the context of the invention as described herein. Where a range of numerical values is stated herein as being less than a stated value, the range is nevertheless bounded on its lower end by a non-zero value.

When values are expressed as approximations, e.g., by use of the antecedent "about," it will be understood that the particular value forms another embodiment. Reference to a particular numerical value includes at least that particular value, unless the context clearly dictates otherwise. The term "about" when used in reference to numerical ranges, cutoffs, or specific values is used to indicate that the recited values may vary by up to as much as 10% from the listed value. Thus, the term "about" is used to encompass variations of ±10% or less, variations of ±5% or less, variations of ±1% or less, variations of ±0.5% or less, or variations of ±0.1% or less from the specified value.

Circuitry, as used herein, may be analog and/or digital components, or one or more suitably programmed processors (e.g., microprocessors) and associated hardware and software, or hardwired logic. Also, "components" may perform one or more functions. The term "component," may include hardware, such as a processor (e.g., microprocessor), an application specific integrated circuit (ASIC), a field programmable gate array (FPGA), a combination of hardware and software, and/or the like. The term "processor" as used herein means a single processor or multiple processors working independently or together to collectively perform a task.

Software may include one or more computer readable instruction that when executed by one or more component, e.g., a processor, causes the component to perform a specified function. It should be understood that the algorithms described herein may be stored on one or more non-transitory computer-readable medium. Exemplary non-transitory computer-readable mediums may include random access memory (RAM), a read only memory (ROM), a CD-ROM, a hard drive, a solid-state drive, a flash drive, a memory card, a DVD-ROM, a Blu-ray Disk, a disk, an optical drive, combinations thereof, and/or the like.

Such non-transitory computer-readable mediums may be electrically based, optically based, magnetically based, and/or the like. Further, the messages described herein may be generated by the components and result in various physical transformations.

As used herein, the terms "network-based," "cloud-based," and any variations thereof, are intended to include the provision of configurable computational resources on demand via interfacing with a computer and/or computer network, with software and/or data at least partially located on a computer and/or computer network.

As used herein, a "route" and/or an "optical route" may correspond to an optical path and/or an optical light-path. For example, an optical route may specify a path along which light is carried between two or more network entities.

As used herein, an optical link may be an optical fiber, an optical channel, an optical super-channel, a super-channel group, an optical carrier group, a set of spectral slices, an optical control channel (e.g., sometimes referred to herein as an optical supervisory channel, or an "OSC"), an optical data channel (e.g., sometimes referred to herein as "BAND"), and/or any other optical signal transmission link.

In some implementations, an optical link may be an optical super-channel. A super-channel may include multiple channels multiplexed together using wavelength-division multiplexing in order to increase transmission capacity. Various quantities of channels may be combined into super-channels using various modulation formats to create different super-channel types having different characteristics. Additionally, or alternatively, an optical link may be a super-channel group. A super-channel group may include multiple super-channels multiplexed together using wavelength-division multiplexing in order to increase transmission capacity.

Additionally, or alternatively, an optical link may be a set of spectral slices. A spectral slice (a "slice") may represent a spectrum of a particular size in a frequency band (e.g., 12.5 gigahertz ("GHz"), 6.25 GHz, etc.). For example, a 4.8 terahertz ("THz") frequency band may include 384 spectral slices, where each spectral slice may represent 12.5 GHz of the 4.8 THz spectrum. A super-channel may include a different quantity of spectral slices depending on the super-channel type.

Referring now to the drawings, and in particular to FIG. 1, shown therein is a diagram of an exemplary embodiment of a datacenter 10 (DC 10) constructed in accordance with the present disclosure. The DC 10 may be a distributed datacenter or a single-location datacenter for example. Generally, the DC 10 comprises a plurality of core switches 14-1 to 14-*h* optically connected via a plurality of optical links 18-1-1 to 18-*k*-*h* to a plurality of pods 22-1 to 22-*k*.

In one embodiment, the DC 10 is a distributed data center utilizing pods 22 and XR optics. In some embodiments, the DC 10 includes resources such as servers, storage caches, and computing servers as described below.

Figure 2A:
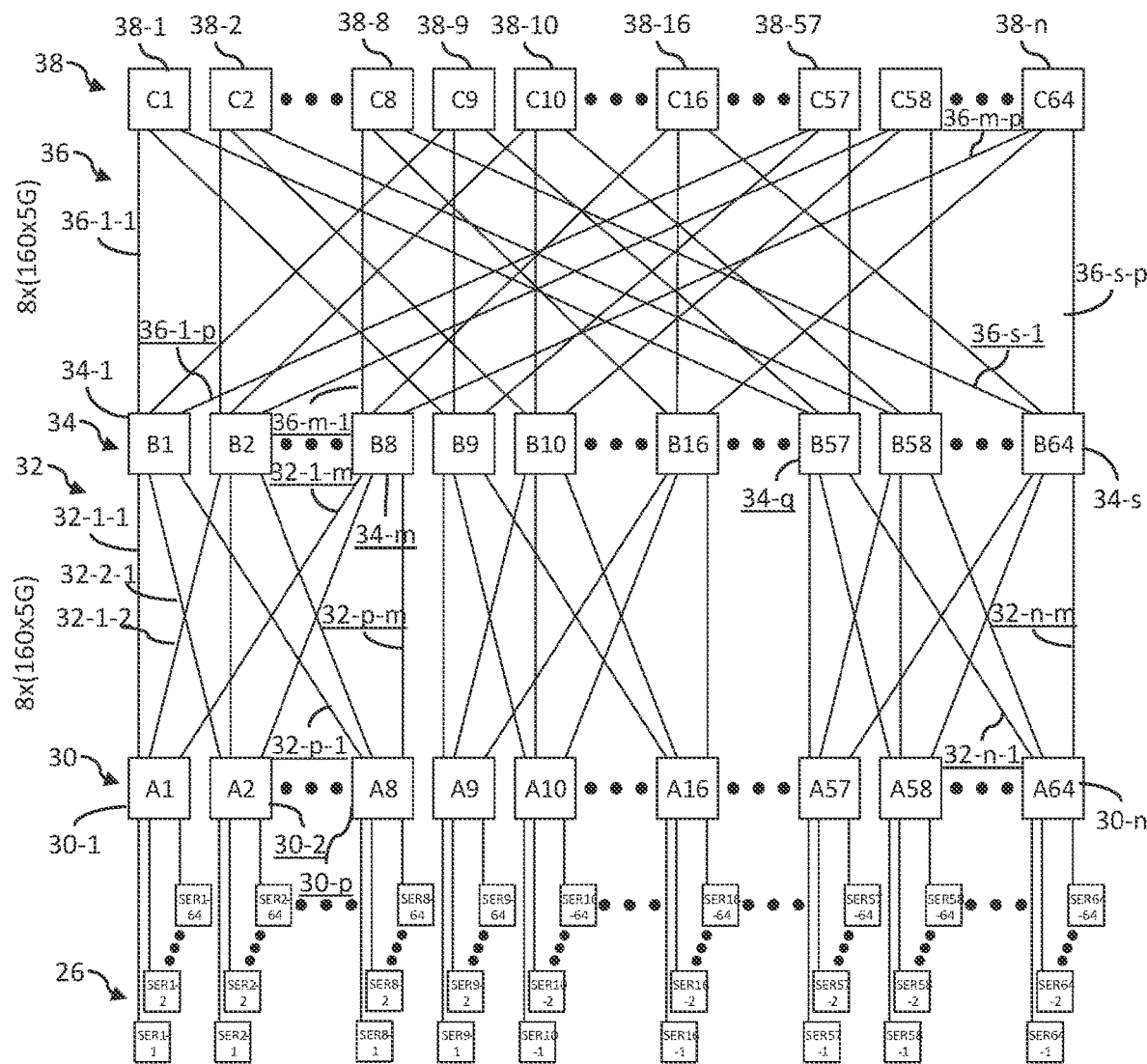
FIG. 2A is a diagram of an exemplary embodiment of a pod constructed in accordance with the present disclosure.

Referring now to FIG. 2A, shown therein is a diagram of an exemplary embodiment of a pod 22 constructed in accordance with the present disclosure. As shown in FIG. 2A, the pod 22 generally comprises a first plurality of servers 26 optically connected to an edge switch 30-1, a second plurality of servers 26 optically connected to an edge switch 30-2, a third plurality of servers 26 optically connected to an edge switch 30-*p*, and a fourth plurality of servers 26 optically connected to an edge switch 30-*n*. The relationship may be that n=m*p. In one embodiment, first plurality of servers 26 is 64 servers 26, the second plurality of servers 26 is 64 servers 26, the third plurality of servers 26 is 64 servers 26, and the fourth plurality of servers 26 is 64 servers, etc. In one embodiment, n is equal to 64, and each pod 22 supports 4096 servers 26.

In one embodiment, each edge switch 30 is optically connected, via an optical links 32, to a plurality of shuffle switches 34. For example, as shown, the edge switch 30-1 is optically connected via an optical link 32-1-1 to shuffle switch 34-1 and via an optical link 32-1-*m* to shuffle switch 34-*m*, the edge switch 30-2 is optically connected to shuffle switch 34-1 via an optical link 32-2-1 and via an optical link 32-2-*m* to shuffle switch 34-*m*, the edge switch 30-*p* is optically connected to shuffle switch 34-1 via an optical link 32-*p*-1 and to shuffle switch 34-*m* via an optical link 32-*p*-*m*, and the edge switch 30-*n* is optically connected to shuffle switch 34-*q* via an optical link 32-*n*-1 and to shuffle switch 34-*s* via an optical link 32-*n*-*m*. The number of shuffle switch is s which is equal to m*m. In general, the optical link 32-*x*-*y* connects between the edge switch 30-*x* and shuffle switch 34-(((x−1) div p)*m+y) where (x−1) div p is the truncated integer of (x−1)/p.

In one embodiment, each shuffle switch 34 is optically connected, via optical links 36, to a plurality of aggregation switches 38, such that, as shown, the shuffle switch 34-1 is optically connected to aggregation switch 38-1 via optical link 36-1-1 and to aggregation switch 38-*c* via optical link 36-1-*p*, the shuffle switch 34-*m* is optically connected to aggregation switch 38-*b* via optical link 36-*m*-1 and to aggregation switch 38-*n* via optical link 36-*m*-*p*, and the shuffle switch 34-*s* is optically connected to aggregation switch 38-*b* via optical link 36-*s*-1 and to aggregation switch 38-*n* via optical link 36-*s*-*p*. In general, the optical link 36-*x*-*y* connects between the shuffle switch 34-*x* and the aggregation switch 38-(((x−1) mod m)+(y−1)*m+1) where the (x−1) mod m is the remainder of (x−1)/m.

As described above, each edge switch 30 is thus connected to each aggregation switch 38 via one of the shuffle switches 34, and each aggregation switch 38 is connected to each edge switch 30 via one of the shuffle switches 34. In this manner, a full mesh is created between the aggregation switches 38 and the edge switches 30.

Figure 2B:
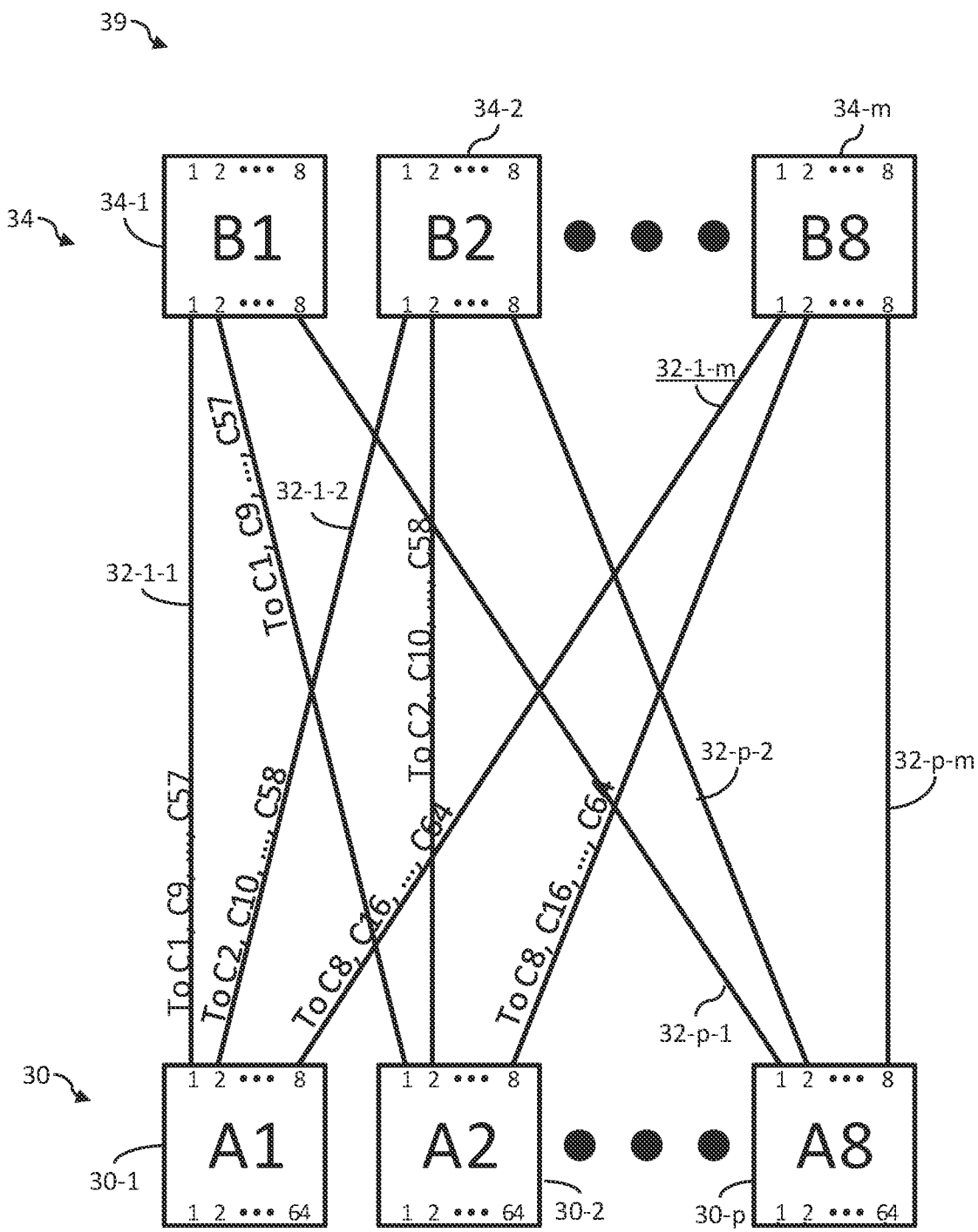
FIG. 2B is a diagram of an exemplary embodiment of a subpod constructed in accordance with the present disclosure.
Figure 3A:
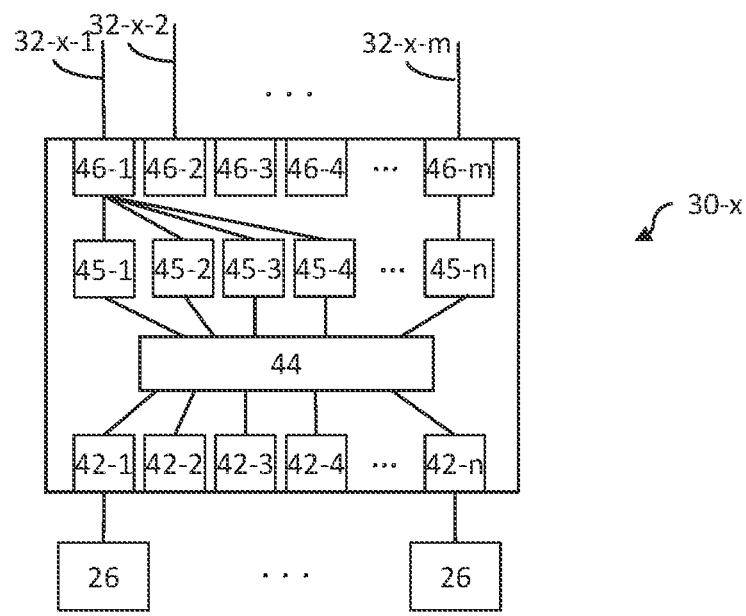
FIG. 3A is a diagram of an exemplary embodiment of the edge switch constructed in accordance with the present disclosure.

Referring now to FIG. 2B in combination with FIG. 3A, shown in FIG. 2B is a diagram of an exemplary embodiment of a subpod 39 of the pod 22 of FIG. 2A constructed in accordance with the present disclosure. The subpod 39 shows the connections between the edge switches 30-1, 30-2 through 30-*p* to the shuffle switches 34-1, 34-2 through 34-*m*, such that m is indicative of a same quantity of shuffle switches 34 as a quantity of shuffle ports 46 of the edge switches 30 (shown in FIG. 3A in greater detail). In the shown embodiment where p=8 and m=8, the edge switch 30-*x* which is one of 30-1 through 30-*p* receives a 100 Gbps optical link from each of the 64 servers 26 connected to a server port 42, and aggregates the sixty-four 100 Gbps optical links into eight 800 Gbps optical links of the shuffle ports 46, each 800 Gbps optical link transmitted via the optical link 32-*x*-*y* which is one of 32-*x*-1 through 32-*x*-*m*. Each of the eight 800 Gbps optical link 32-*x*-*y* may carry data directed to a particular set of p aggregation switches.

For example, the first optical link 32-1-1 from the edge switch 30-1 to shuffle switch 34-1 may carry data directed to a first aggregation switch 38 (e.g., the aggregation switch 38-1) and to every next mth aggregation switch, such as, if m=8, a ninth aggregation switch 38-9, a seventeenth aggregation switch (not shown), etc., through a fifty-seventh aggregation switch 38-57, while a second optical link 32-1-2 from the edge switch 30-1 to the shuffle switch 34-2 may carry data directed to a second aggregation switch 38-2 and to every next mth aggregation switch after the second aggregation switch 38-2, such as a tenth aggregation switch 38-10, an eighteenth aggregation switch (not shown), etc., and the mth optical link 32-1-*m* from the edge switch 30-1 to shuffle switch 34-*m* may carry data directed to an mth aggregation switch 38, and to every next mth aggregation switch 38, such as a sixteenth aggregation switch 38-16, a twenty-fourth aggregation switch (not shown), etc., through a sixty-fourth aggregation switch 38, e.g., aggregation switch 38-*n*.

This pattern of coupling each edge switch 30 to shuffle switch 34 is continued for each edge switch 30. For example, similarly, optical link 32-2-1 from the edge switch 30-2 to shuffle switch 34-1 may carry data directed to a first aggregation switch 38 (e.g., the aggregation switch 38-1) and to every next mth aggregation switch, such as, if m=8, a ninth aggregation switch 38-9, a seventeenth aggregation switch 38, etc., through a fifty-seventh aggregation switch 38-57, while a second optical link 32-2-2 from the edge switch 30-2 to the shuffle switch 34-2 may carry data directed to a second aggregation switch 38 (e.g., the aggregation switch 38-2) and to every next mth aggregation switch after the second aggregation switch 38-2, such as a tenth aggregation switch 38-10, an eighteenth aggregation switch 38, etc., and the mth optical link 32-2-*m* from the edge switch 30-2 to shuffle switch 34-*m* may carry data directed to an mth aggregation switch 38-8, and to every next mth aggregation switch, such as a sixteenth aggregation switch 38-16, a twenty-fourth aggregation switch 38, etc., through a sixty-fourth aggregation switch 38, e.g., aggregation switch 38-*n*.

Referring now to FIG. 3A, shown therein is a diagram of an exemplary embodiment of the edge switch 30 constructed in accordance with the present disclosure. As shown, the edge switch 30-*x* comprises a plurality of server ports 42-1 through 42-*n*, each server port 42 is in optical communication with a particular server 26. The number of servers 26 in communication with the edge switch 30 may be determined by the number of server ports 42 available on the edge switch 30. For example, if the edge switch 30 includes 64 server ports 42, the edge switch 30 may be optically coupled to 64 servers 26.

In some embodiments, the edge switch 30 may comprise an intermediate shuffle layer 45, the intermediate shuffle layer 45 being the switch core ports corresponding to the side going to the aggregation switches 38. There may be n ports just like there are n ports (42-1 to 42-*n*) facing the servers 26. However, every p ports facing the aggregation switches 38 may be combined into one higher capacity port 46. Intermediate shuffle ports 45-1 to 45-*p* may be combined into port 46-1. Intermediate shuffle port 45-*(p+1)* to port 45-*(p\*2)* may be combined into port 46-2. Intermediate shuffle port 45-*(n−p+1)* to port 45-*n* may be combined into port 46-*m*. The relationship may be that n=m*p.

In one embodiment, the edge switch 30 comprises a plurality of shuffle ports 46-1 through 46-*m*. Each shuffle port 46 is optically coupled to a particular optical link 32, such as the optical links 32-*x*-1 and 32-*x*-2 through 32-*x*-*m*. While only three optical links 32 are shown, the number of optical links 32 is limited by the number of shuffle ports 46 in the edge switch 30-*x*.

In one embodiment, each optical link 32 is optically coupled to a shuffle port 46 and comprises a fiber bundle carrying a plurality of data-streams. Each data stream, in turn, comprises a plurality of optical signals. Each of the edge switches 30 has more server ports 42 than shuffle ports 46. For example, in one embodiment, the edge switch 30 comprises 64 server ports 42 and 8 shuffle ports 46 wherein the data from 64 server ports 42 is aggregated and switched, e.g., by switch core 44, to one (1) intermediate shuffle port 45. Thus, if each of the server ports 42 is receiving 100 Gbps of data, 100 Gbps of data is being forwarded to each intermediate shuffle port 45, and 800 Gbps of data is being forwarded to each shuffle port 46. In this example, each optical link 32 comprises a fiber bundle comprising 8 data streams having a bandwidth of 100 Gbps. Each data stream, in turn, is transmitted over 20 optical fibers/signals having a 5 Gbps virtual lane. Thus, each optical link 32 is an 800 Gbps optical link e.g., having 160 optical fibers, and each shuffle port 46 comprises 8 sets of twenty 5 Gbps transceivers. In some embodiments, each fiber bundle includes between 100 and 2000 optical fibers.

In one embodiment, each server port 42 comprises a coherent optical transceiver operating at a first data speed and each shuffle port 46 comprises a multi-core optical transceiver operating at a second data speed, where the second data speed is slower than the first data speed. For example, the first data speed may be 100 Gbps while the second data speed is within a range of 1 to 10 Gbps, and may be 5 Gbps. The first data speed may be within a range of 10 to 100 times greater than the second data speed. The number of shuffle ports 46 of each edge switch 30 may be a square root of the number of server ports 42 of the edge switch 30.

Figure 3B:
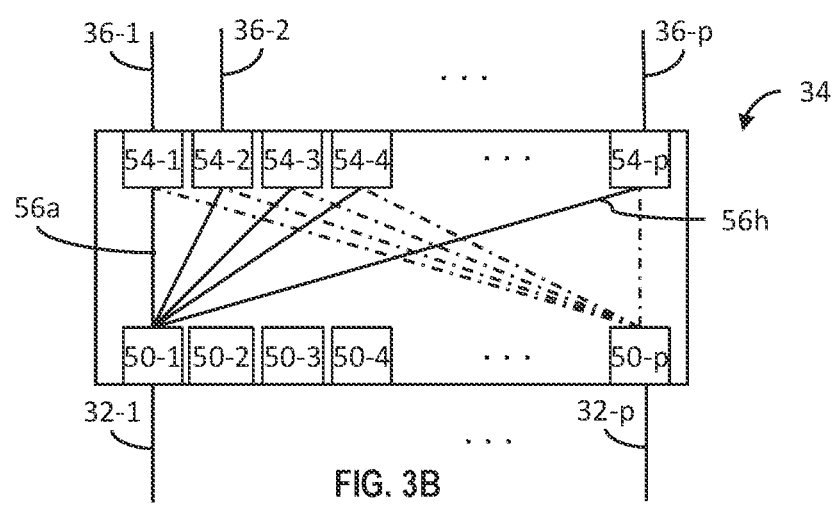
FIG. 3B is a diagram of an exemplary embodiment of a shuffle switch constructed in accordance with the present disclosure.

Referring now to FIG. 3B, shown therein is a diagram of an exemplary embodiment of the shuffle switch 34 constructed in accordance with the present disclosure. In the embodiment shown, such as, if p=8, the shuffle switch 34 comprises a plurality (e.g., eight) edge transceiver blocks 50-1 through 50-*p* optically coupled with the optical links 32-1-32-*p* and a plurality (e.g., eight) aggregation transceiver blocks 54-1 through 54-*p* optically coupled with the optical links 36-1-36-*p*. For example, in one embodiment, the shuffle switch 34 comprises 8 edge transceiver blocks 50 optically coupled to the optical links 32. Shown in FIG. 3B is the edge transceiver block 50-1 optically coupled to the optical link 32-1 and the edge transceiver block 50-*p* optically coupled to the optical link 32-*p*. Eight aggregation transceiver blocks 54 are optically coupled to the optical links 36, shown in FIG. 3B as the aggregation transceiver block 54-1 optically coupled to the optical link 36-1 and the aggregation transceiver block 54-*p* optically coupled to the optical link 36-*p*.

In traditional switches with 100 Gbps ports, each 100 Gbps interface utilizes four 25 Gbps differential 100-ohm transmission links to connect the switch and transceiver, where each 100 Gbps stream is PCS encoded 64B/66B words are distributed into 4 lanes, i.e., four 25 Gbps physical links each having five 5 Gbps virtual links.

Conversely, in one embodiment, the edge transceiver block 50 includes a plurality of multi-core optical transceivers 55 (shown in FIG. 3D) operable to receive a first plurality of optical signals and transmit a second plurality of optical signals. For example, the edge transceiver block 50 is optically coupled with a fiber bundle carrying the optical link 32, where the optical link 32 is an 800 Gbps link comprising eight 100 Gbps streams which each 100 Gbps stream in-turn comprises twenty 5 Gbps virtual lanes 57 (shown in FIG. 3D). The edge transceiver block 50 may include 8 multi-core optical transceivers 55 having an interface operating at 100 Gbps wherein each 100 Gbps interface corresponds to a particular one of the eight 100 Gbps streams. Each 100 Gbps interface utilizes twenty 5 Gbps short, high-impedance interconnects to receive a particular optical signal corresponding to a particular one of the 5 Gbps virtual lanes. From each 100 Gbps interface, PCS encoded 64B/66B words are distributed into twenty 5 Gbps physical lanes 59, as described below in more detail in relation to FIG. 3D. Each multi-core optical receiver 55, then, includes at least twenty optical transceivers (described below in FIG. 5), i.e., at least one optical transceiver for each of the twenty 5 Gbps interconnects.

In one embodiment, each transceiver block and/or shuffle port, having eight multi-core optical transceivers, consumes approximately 0.2 W of power, such that, for each pod 22, a total power consumption for all multi-core optical transceivers is approximately 409.6 W.

Figure 3C:
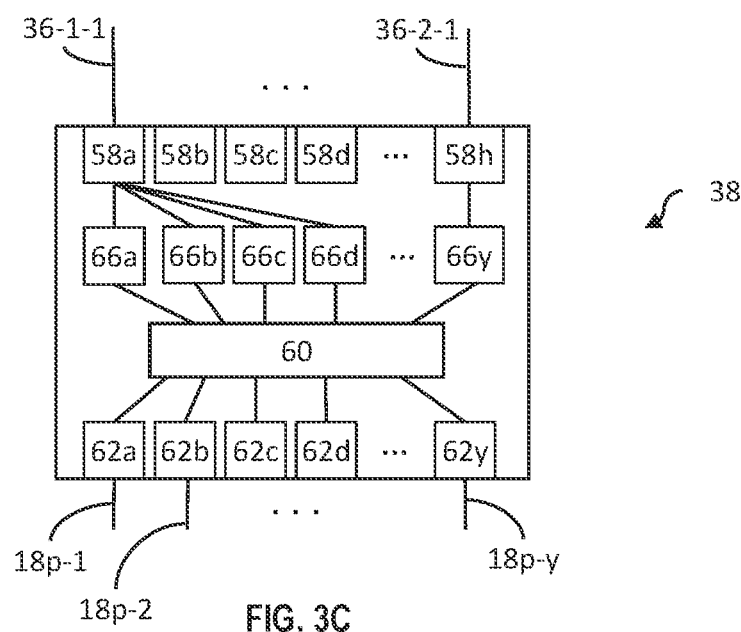
FIG. 3C is a diagram of an exemplary embodiment of an aggregation switch constructed in accordance with the present disclosure.
Figure 3D:
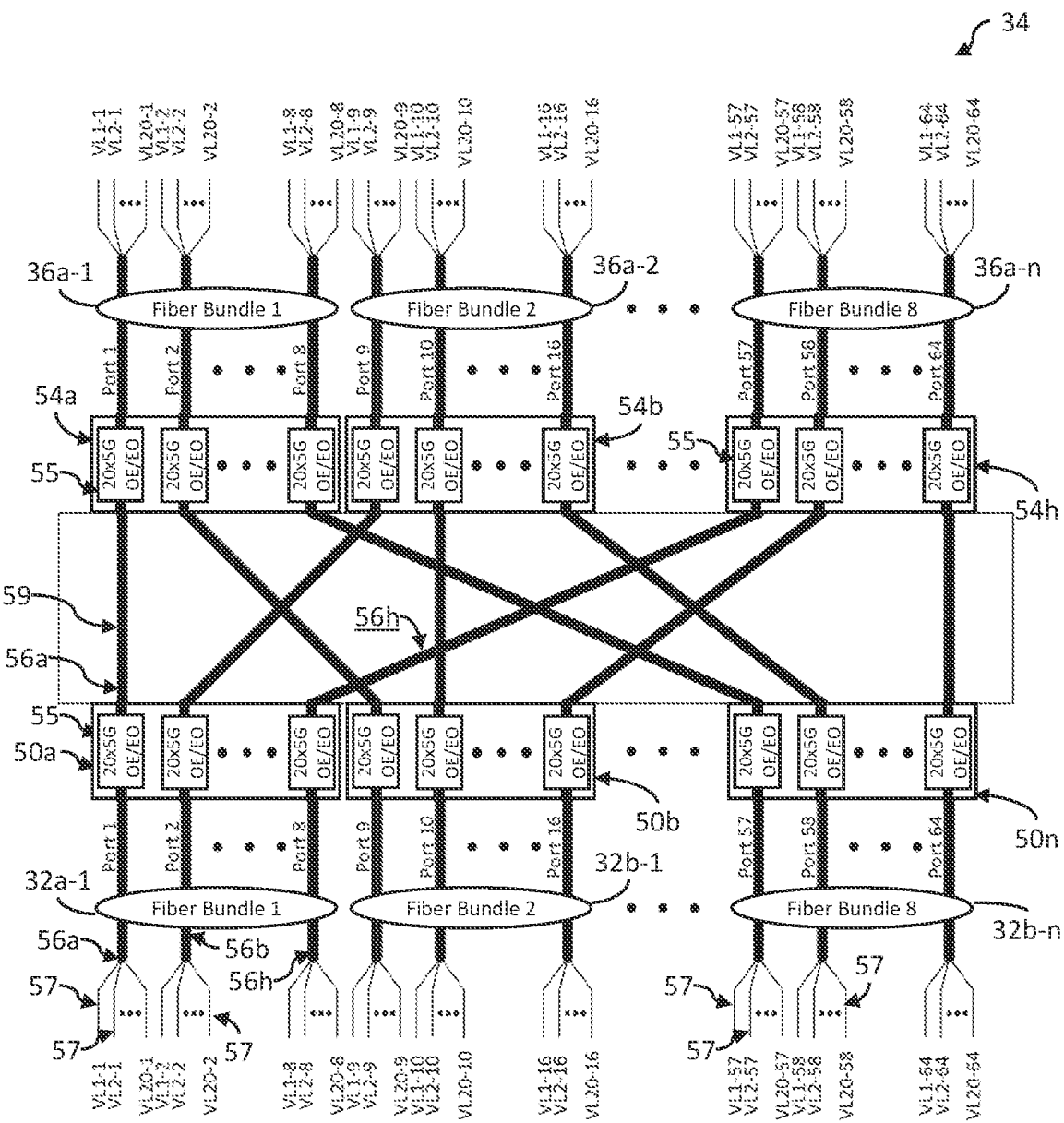
FIG. 3D is a diagram of an exemplary embodiment of the shuffle switch of FIG. 3B constructed in accordance with the present disclosure.

In one embodiment of the present disclosure, for example as shown in FIG. 3D, each edge transceiver block 50 receives the 800 Gbps optical link comprising the 8 data streams 56a-h, each having a 100 Gbps link. In order to route each of the 100 Gbps links to a different aggregation switch 38, the edge transceiver block 50 of the shuffle switch 34 maps each 100 Gbps link data stream 56 to a different aggregation transceiver block 54. For example, as shown in FIG. 3B, the edge transceiver block 50a maps each data stream 56 of the 800 Gbps optical link 32-1-1 to each aggregation transceiver block 54 such that the data stream 56a is mapped to a first multi-core optical transceiver 55 of the aggregation transceiver block 54a and continues mapping each consecutive data stream 56 to a first multi-core optical transceiver 55 of each consecutive aggregation transceiver block 54 until the data stream 56h is mapped to a first multi-core optical transceiver 55 of the aggregation transceiver block 54h. This mapping is continued for each optical link 32 received by the edge transceiver blocks 50b-50h such that each consecutive aggregation transceiver block 54 receives a respective data stream from each edge transceiver block 50.

In one embodiment, when mapping each data stream to a different aggregation transceiver block 54, the traffic from each data stream from the edge switches 30 may be evenly distributed between the shuffle switch 34 and the aggregation switches 38. Similarly, the traffic from each aggregation switch 38 may be evenly distributed between the shuffle switch 34 and the edge switches 30. In this manner, the shuffle switch 34 is bi-directional, i.e., data and/or traffic can flow both from the aggregation switch 38 through the shuffle switch 34 to the edge switch 30 and from the edge switch 30 through the shuffle switch 34 to the aggregation switch 38. This mapping process is discussed in more detail below.

Referring now to FIG. 3C, shown therein is a diagram of an exemplary embodiment of an aggregation switch 38-n constructed in accordance with the present disclosure. The aggregation switch 38-n generally comprises a plurality (e.g., eight) shuffle ports 58a-h in optical communication with optical links 36, shown in FIG. 3C as shuffle ports 58a-h with shuffle port 58a in optical communication with optical link 36-1-1 and shuffle port 58b in optical communication with optical link 36-2-1. The aggregation switch 38-n further comprises a plurality of core ports 62a-y optically coupled to the optical links 18, shown in FIG. 3C as the core port 62a optically coupled to optical link 18p-1, the core port 62b optically coupled to optical link 18p-2, and continuing in this fashion through the core port 62y optically coupled to the optical link 18p-y.

In one embodiment, the aggregation switch 38 comprises 64 core ports 62 and 8 shuffle ports 58 wherein the data from the 8 shuffle ports 58 is disaggregated, e.g., by optical switch 60, to eight particular core ports 62. Thus, if each of the shuffle ports 58 is receiving at 800 Gbps, 100 Gbps is being forwarded to each of the 8 particular core ports 62.

In some embodiments, the aggregation switch 38 may comprise intermediate ports 66, the intermediate ports 66a-y being the switch core ports corresponding to the side going to the shuffle switch 34. There may be y ports just like there are y ports (62a to 62y) optically coupled to the optical links 18. However, every port 58 coupled to the optical links 18 may be disaggregated into a plurality of lesser capacity intermediate ports 66. Intermediate Port 58a may be disaggregated into intermediate ports 66a to 66p. Port 58b may be disaggregated to intermediate port 66-(p+1) to intermediate port 66-(p*2). Port 58b may be disaggregated to intermediate port 66-(y−p+1) to intermediate port 66-y. The relationship may be that y=h*p.

Referring back to FIG. 1 in combination with FIG. 3C, in one embodiment, each core switch 14 includes a plurality of pod ports (equal to, or greater than, the number of pods 22). The core ports 62 can be connected to the pod ports of the core switches 14 in a manner similar to how the aggregation stage connects to the core stage in the standard fat tree data center architecture.

Figure 4:
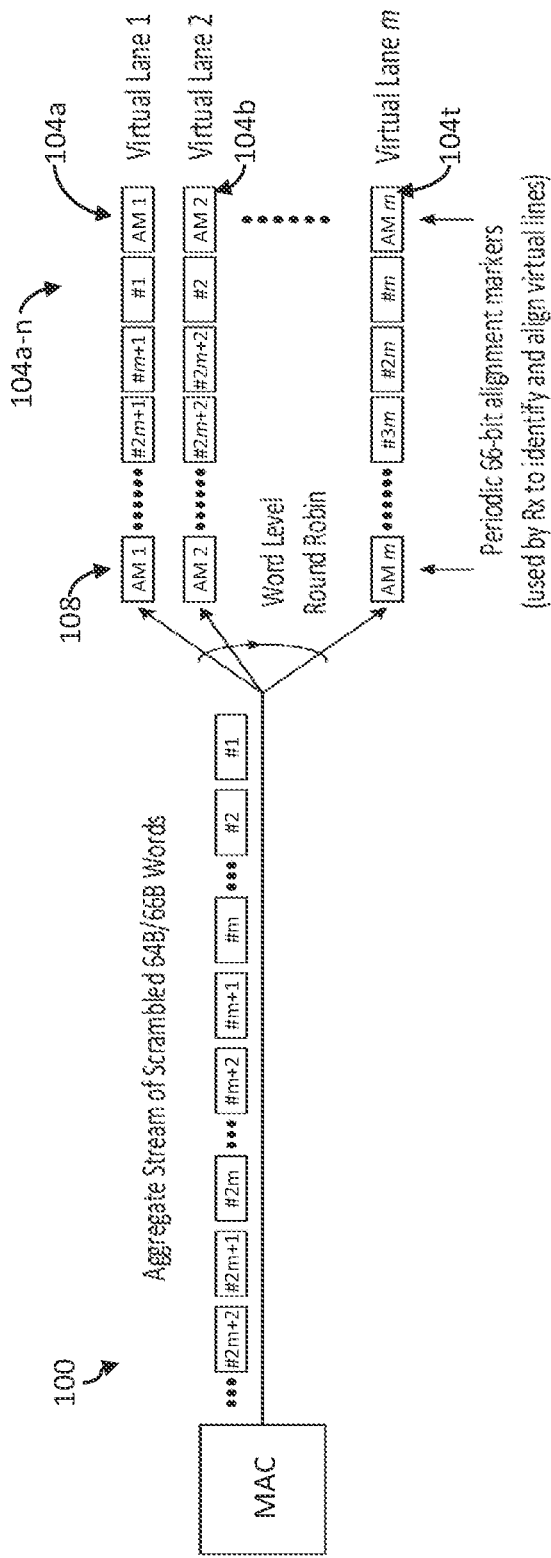
FIG. 4 is a diagram of an exemplary embodiment of a data stream mapped into a plurality of virtual lanes in accordance with the present disclosure.

Referring now to FIG. 4, shown therein is a diagram of an exemplary embodiment of a data stream 100 mapped into a plurality of virtual lanes 104a-n in accordance with the present disclosure. Each data stream 100, as shown in FIG. 4, may be a 100 Gbps data stream comprising an aggregate stream of scrambled 64B/66B encoded PCS words.

In one embodiment, the shuffle switch 34 comprises the plurality of edge transceiver blocks 50 having a plurality of multi-core optical transceivers. Each edge transceiver block 50 may include 8 multi-core optical transceivers having an interface operating at 100 Gbps wherein each 100 Gbps interface corresponds to a particular one of the eight 100 Gbps data streams 100 comprising twenty 5 Gbps virtual lanes 104 having interlaced data. Upon receiving a particular data stream 100 by a particular multi-core optical transceiver 55 (described in more detail below), the particular multi-core optical transceiver 55 performs an optical-to-electrical conversion on the particular data stream 100 into twenty 5 Gbps electrical lanes (each electrical lane corresponding to a particular one of the virtual lanes 104) and routes the twenty 5 Gbps electrical lanes together. The shuffle switch 34 then distributes the particular data stream 100 to a particular one of the aggregation transceiver blocks 54 as described above where the particular aggregation transceiver block 54 performs an electrical-to-optical conversion of each of the twenty 5 Gbps electrical lanes of the particular data stream 100 into a 100 Gbps optical signal, which in addition to other data streams 56 from other multi-core transceivers of the particular aggregation transceiver block 54, form a particular optical link 36 having an 800 Gbps capacity.

In one embodiment, a 100 Gbps data stream 100 can be evenly distributed into twenty 5 Gbps virtual lanes 104a-t in a round-robin fashion. Each virtual lane includes an alignment marker 108 inserted after a predetermined number of words distributed into a virtual lane 104. In some embodiments, each alignment marker 108 is a 66-bit word.

In one embodiment, each of the virtual lanes 104 can be routed independently of other lanes. The shuffle switch 34 may receive each of the virtual lanes 104 via the optical link 32 optically coupled to the edge transceiver block 50. The shuffle switch 34 may then use the alignment markers 108 to de-skew each virtual lane 104 before multiplexing the virtual lanes 104 into a second data stream (e.g., a 100 Gbps data stream) and transmitting the second data stream, via the aggregation transceiver blocks 54 along the optical link 36.

In one embodiment, the electrical lane capacity and the capacity of each multi-core transceiver is selected based on a size of the virtual lanes 104 such that each virtual lane 104 is equivalent to the capacity of the multi-core transceiver. In other embodiments, the multi-core transceiver capacity is selected at multiples of the virtual lanes 104 to decrease complexity of routing and mapping the virtual lanes 104 into optical links. Generally, the multi-core transceiver, for each virtual lane 104, has a capacity of about 25 Gbps or less or of about 10 Gbps or less, and preferably, the multi-core transceiver has a capacity of about 5 Gbps per virtual lane 104.

Figure 5:
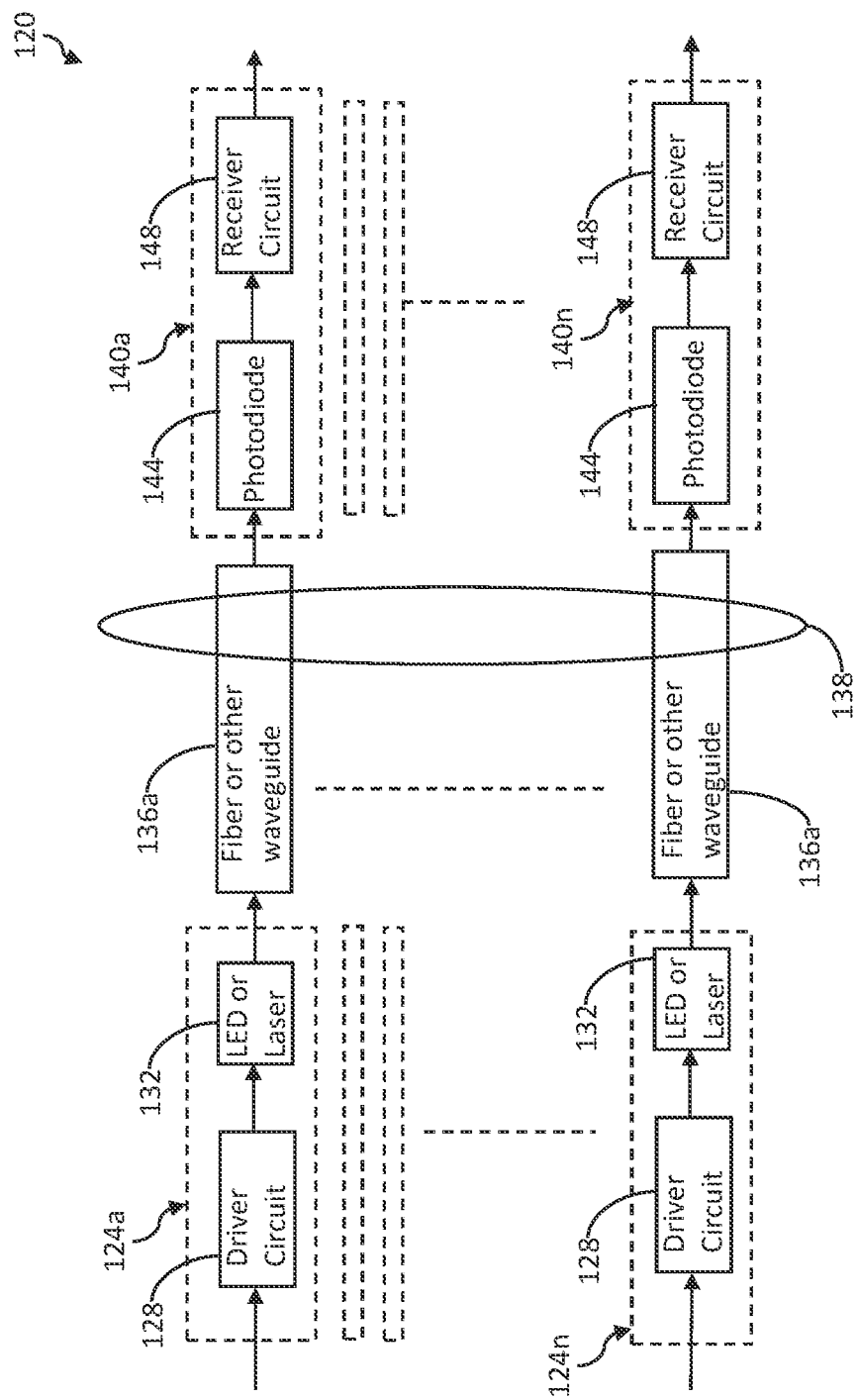
FIG. 5 is a diagram of an exemplary embodiment of an optical link constructed in accordance with the present disclosure.

Referring now to FIG. 5, shown therein is a diagram of an exemplary embodiment of an optical link 120 constructed in accordance with the present disclosure. The optical link 120 generally comprises a plurality of upstream transmitters 124*a-n*, operable to receive data or an electrical input signal to be routed or switched and comprising at least a driver circuit 128 to convert the received data and/or electrical signal into a driving signal for controlling an optical power source 132 which outputs a modulated optical signal based on the driving signal.

In one embodiment, the optical link 120 further includes a plurality of transmission mediums 136*a-n*, such as a plurality of fiber optical cables, or a plurality of other waveguides, forming a fiber bundle 138 and is optically coupled to each upstream transmitter 124. The transmission medium is operable to carry the optical signal and is optically coupled to a plurality of downstream receivers 140*a-n*, configured to receive the modulated optical signal, for example, with a photodiode 144. The photodiode 144 converts the received modulated optical signal to a corresponding electrical signal that is supplied to receiver circuit 148, to reconstruct the data and/or electrical signal transmitted by the upstream transmitter 124*a-n* as an output electrical signal.

In one embodiment, the number of upstream transmitters 124, transmission mediums 136, and downstream receivers 140 may be dependent on a number of data streams transmitted through the fiber bundle 138.

In one embodiment, the driver circuit 128 and/or the receiver circuit 148 may include circuitry having one or more processor and one or more non-transitory computer-readable medium storing processor-executable instructions, such as a read only memory or random-access memory. Specific embodiments of the optical link 120 may optionally be provided with additional elements that are not shown in the Figures such as a digital signal processor (DSP), and additional high-speed integrated circuit (ASIC or FPGA) that is specialized to handle high-speed data frames/packets. Other embodiments may optionally be provided with additional elements that are not shown in the Figures such as a Wavelength Selective Switch (WSS), Variable Optical Attenuator (VOA), Erbium Doped Fiber Amplifier (EDFA), or Raman amplifiers, and optical channel monitors, for instance.

In one embodiment, the upstream transmitters 124 and the downstream receivers 140 are integrated into a transceiver (such as a multi-core optical transceiver 55) having both an optical transmitter (constructed similar to the upstream optical transmitter 124) and an optical receiver (constructed similar to the downstream receiver 140) and provides for bi-directional communication. In one embodiment, the transceivers are coherent optical transceivers coupled to a fiber pair and operable to receive a client data from an electrical signal and transmit the client data in a first optical signal and/or receive the client data from a second optical signal and transmit the client data in an electrical signal, or a combination thereof.

In one embodiment, the optical power source 132 is one or more of a laser and, preferably, an LED, and is controlled by the driver circuit 128 to generate an optical signal having the encoded data based upon electrical signals. The generation of laser beams for use as optical data carrier signals is explained, for example, in U.S. Pat. No. 8,155,531, entitled "Tunable Photonic Integrated Circuits", issued Apr. 10, 2012, and U.S. Pat. No. 8,639,118, entitled "Wavelength division multiplexed optical communication system having variable channel spacings and different modulation formats," issued Jan. 28, 2014, which are hereby fully incorporated in their entirety herein by reference.

Figure 6:
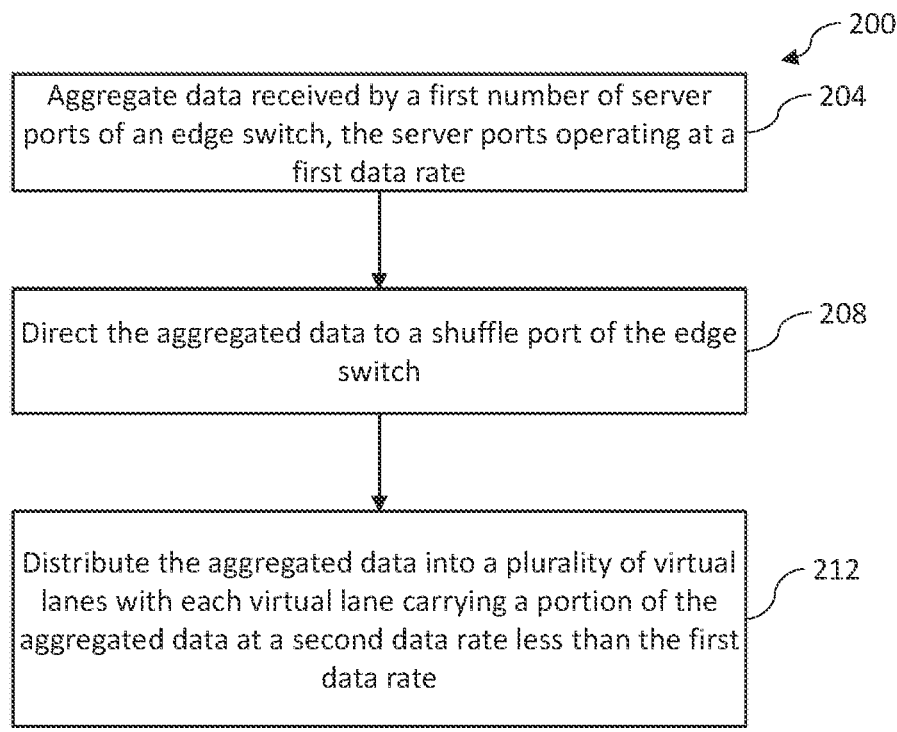
FIG. 6 is a process flow diagram of an exemplary embodiment of a process in accordance with the present disclosure.

Referring now to FIG. 6, shown therein is a process flow diagram of an exemplary embodiment of a process 200 in accordance with the present disclosure. The process 200 generally comprises the steps of: aggregating data received by a first number of server ports of an edge switch, the server ports operating at a first data rate (step 204); directing the aggregated data to a shuffle port of the edge switch (step 208); and distributing the aggregated data into a plurality of virtual lanes with each virtual lane carrying a portion of the aggregated data at a second data rate less than the first data rate (step 212).

In one embodiment, aggregating data received by a first number of server ports of an edge switch, the server ports operating at a first data rate (step 204) includes the server ports operating at the first data rate within a range of 10 to 100 times greater than the second data rate.

In one embodiment, distributing the aggregated data into a plurality of virtual lanes with each virtual lane carrying a portion of the aggregated data at a second data rate less than the first data rate (step 212) includes distributing the aggregated data into the plurality of virtual lanes having a combined data rate greater than the first data rate. In one embodiment, the combined data rate is 800 Gbps and the first data rate is 100 Gbps.

In one embodiment, directing the aggregated data to a shuffle port of the edge switch (step 208) further includes routing the virtual lanes to a plurality of aggregation switches through an optical to electrical to optical (OEO) shuffle switch.

In one embodiment, the process 200 further includes the step of passing optical signals indicative of the virtual lanes onto first fibers of a fiber bundle, and converting the optical signals of each virtual lane into electrical signals by a transceiver, and routing the virtual lanes to particular ones of a plurality of aggregation transceiver blocks.

From the above description, it is clear that the inventive concept(s) disclosed herein are well adapted to carry out the objects and to attain the advantages mentioned herein, as well as those inherent in the inventive concept(s) disclosed herein. While the embodiments of the inventive concept(s) disclosed herein have been described for purposes of this disclosure, it will be understood that numerous changes may be made and readily suggested to those skilled in the art which are accomplished within the scope and spirit of the inventive concept(s) disclosed herein.

What is claimed is:

1. A data center interconnect, comprising:
a plurality of edge switches, each edge switch having a plurality of server ports and a plurality of shuffle ports, each server port receiving data signals from a server at a first data speed, a first number (m) of server ports exceeding a second number of shuffle ports (k), and the edge switches having first circuitry to aggregate data from multiple server ports and pass the aggregated data to a particular one of the shuffle ports, the shuffle ports having a plurality of first optical transmitters with each first optical transmitter having a second data speed less than the first data speed and having an aggregated data rate of the first optical transmitter for each shuffle port exceeding the first data speed, the first optical transmitter generating first optical data streams carrying the aggregated data;

a plurality of first fiber bundles connected to the shuffle ports and carrying the first optical data streams, each first fiber bundle having first fibers;

a plurality of shuffle switches, the shuffle switches having a plurality of edge receiver blocks and a plurality of aggregation transmitter blocks, each of the edge receiver blocks having a first optical receiver connected to a particular first fiber within one of the fiber bundles of the first group and receiving a particular one of the first optical data streams carrying a portion of the aggregated data from a particular one of the shuffle ports of the edge switches, the first optical receiver of the edge receiver blocks converting the optical data streams into electrical data streams and the edge receiver blocks having electrical circuitry routing the electrical data streams to each of the aggregation transmitter blocks, the aggregation transmitter blocks having a plurality of second optical transmitters converting the electrical data streams to second optical data streams having the aggregated data;

a plurality of second fiber bundles connected to the aggregation transmitter blocks and carrying the second optical data streams, each second fiber bundle having second fibers; and a plurality of aggregation switches having a plurality of shuffle ports and core ports, a number of core ports exceeding a number of shuffle ports, the shuffle ports having a plurality of second optical receivers with each second optical receiver connected to a particular second fiber within one of the second fiber bundles of the second group and receiving a particular one of the second optical data streams carrying a portion of the aggregated data from selected ones of the aggregation transmitter blocks, each aggregation switch having second circuitry to disaggregate the aggregated data in the optical data stream received by each shuffle port into sub data streams supplied to multiple core ports.

2. The data center interconnect of claim 1, wherein the number of shuffle ports of each edge switch is a square root of the number of server ports of the edge switch.

3. The data center interconnect of claim 2 wherein the first number of server ports (m) for each edge switch is K times the number of shuffle ports (k).

4. The data center interconnect of claim 1, wherein the second data speed is within a range from 1 Gbps to 10 Gbps.

5. The data center interconnect of claim 1, wherein each fiber bundle includes greater than 100 optical fibers.

6. The data center interconnect of claim 5, wherein each fiber bundle includes less than 2000 optical fibers.

7. The data center interconnect of claim 1, wherein the first data speed is 100 Gbps, the second data speed is 5 Gbps, and each fiber bundle includes 160 optical fibers.

8. The data center of claim 3, wherein each shuffle switch includes k edge transmitter blocks and k aggregation receiver blocks.

9. A method, comprising:
aggregating data received by a first number of server ports of an edge switch, the server ports operating at a first data speed;
distributing the aggregated data into a plurality of virtual lanes with each virtual lane carrying a portion of the aggregated data at a second data speed less than the first data speed.

10. The method of claim 9, wherein the first data speed is within a range of 10 to 100 times greater than the second data speed.

11. The method of claim 9, wherein a combined data rate of the plurality of virtual lanes is greater than the first data speed.

12. The method of claim 11, wherein the combined data rate is 800 Gbps and the first data rate is 100 Gbps.

13. The method of claim 9, further comprising routing the virtual lanes to a plurality of aggregation switches through a shuffle switch.

14. The method of claim 9, further comprising passing optical signals indicative of the virtual lanes onto first fibers of a fiber bundle, and converting the optical signals of each virtual lane into electrical signals by a transceiver, and routing the virtual lanes to particular ones of a plurality of aggregation transceiver blocks.

15. A data center interconnect, comprising:
a plurality of edge switches, each edge switch having a plurality of server ports and a plurality of shuffle ports, each server port receiving data signals from a server at a first data speed, a first number (m) of server ports exceeding a second number of shuffle ports (k), and the edge switches having first circuitry to aggregate data from multiple server ports and pass the aggregated data to a particular one of the shuffle ports, the shuffle ports having a plurality of first optical transceivers with each first optical transceiver having a second data speed less than the first data speed and having an aggregated data rate of the first optical transceiver for each shuffle port exceeding the first data speed, the first optical transceiver generating first optical data streams carrying the aggregated data;

a plurality of first fiber bundles connected to the shuffle ports and carrying the first optical data streams, each first fiber bundle having first fiber pairs;

a plurality of shuffle switches, the shuffle switches having a plurality of edge transceiver blocks and a plurality of aggregation transceiver blocks, each of the edge transceiver blocks having a second optical transceiver connected to a particular first fiber pair within one of the fiber bundles of the first group and receiving a particular one of the first optical data streams carrying a portion of the aggregated data from a particular one of the shuffle ports of the edge switches, the second optical transceivers of the edge transceiver blocks converting the optical data streams into electrical data streams and the edge transceiver blocks having electrical circuitry routing the electrical data streams to each of the aggregation transceiver blocks, the aggregation transceiver blocks having a plurality of third transceivers converting the electrical data streams to second optical data streams having the aggregated data;

a plurality of second fiber bundles connected to the aggregation transceiver blocks and carrying the second optical data streams, each second fiber bundle having second fiber pairs; and a plurality of aggregation switches having a plurality of shuffle ports and core ports, a number of core ports exceeding a number of shuffle ports, the shuffle ports having a plurality of fourth optical transceivers with each fourth optical transceiver connected to a particular second fiber pair within one of the second fiber bundles of the second group and receiving a particular one of the second optical data streams carrying a portion of the aggregated data from selected ones of the aggregation transceiver blocks, each aggregation switch having second circuitry to disaggregate the aggregated data in the optical data stream received by each shuffle port into sub data streams supplied to multiple core ports.

16. The data center interconnect of claim 15, wherein the number of shuffle ports of each edge switch is a square root of the number of server ports of the edge switch.

17. The data center interconnect of claim 16 wherein the first number of server ports (m) for each edge switch is K times the number of shuffle ports (k).

18. The data center interconnect of claim 17, wherein each shuffle switch includes k edge transceiver blocks and k aggregation transceiver blocks.

19. The data center interconnect of claim 15, wherein the second data speed is within a range from 1 Gbps to 10 Gbps.

20. The data center interconnect of claim 15, wherein each fiber bundle includes greater than 100 optical fibers.

21. The data center interconnect of claim 15, wherein the first data speed is 100 Gbps, the second data speed is 5 Gbps, and each fiber bundle includes 160 optical fibers.

* * * * *